Oct. 20, 1959     S. W. ROLPH     2,909,588
STORAGE BATTERY SEPARATOR
Filed Jan. 5, 1953     2 Sheets-Sheet 1
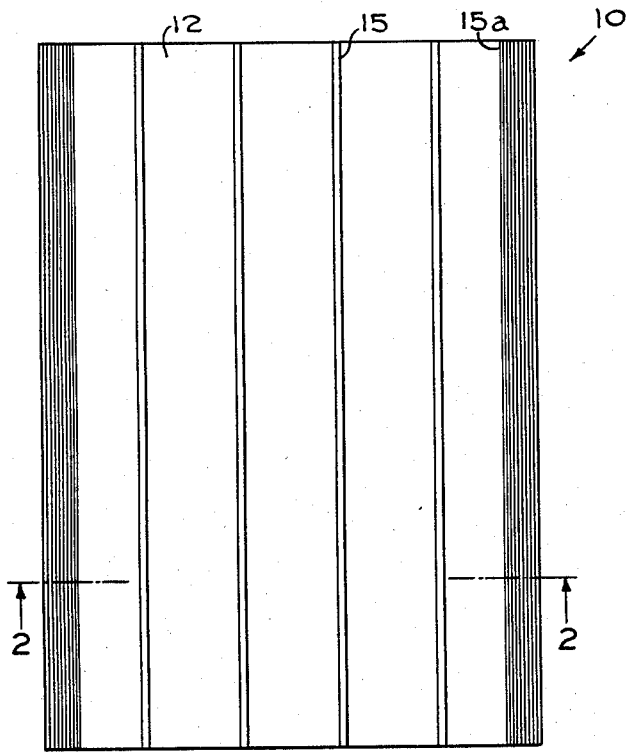
FIG. 1
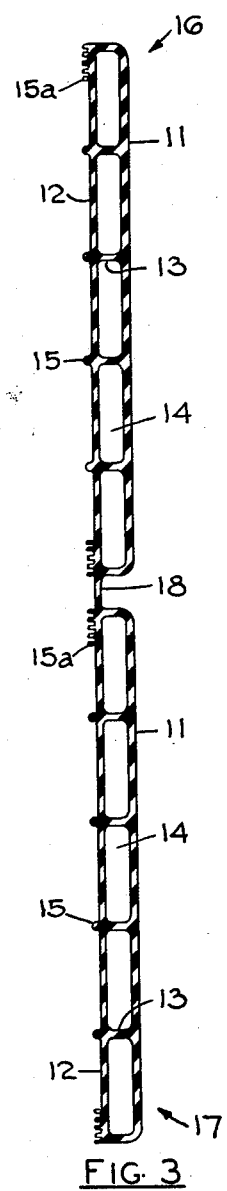
FIG. 3
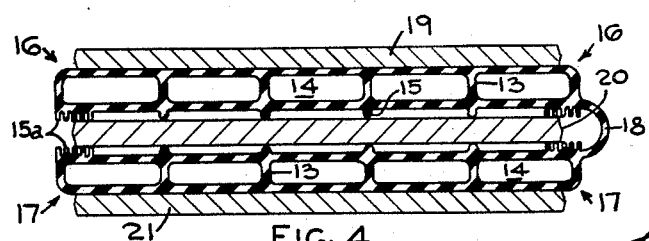
FIG. 2
FIG. 4
INVENTOR
SAMUEL WYMAN ROLPH
BY
ATTORNEY

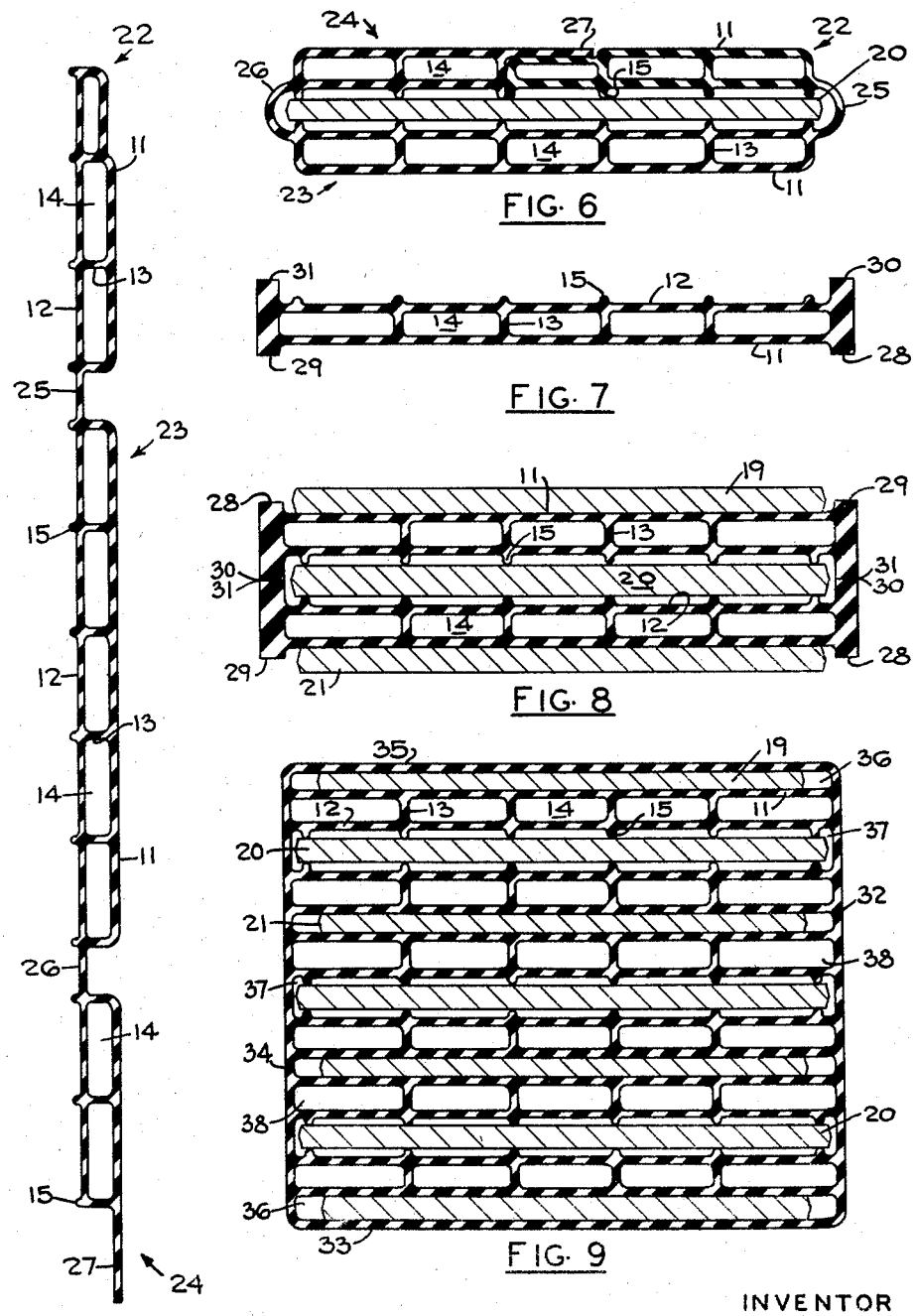

United States Patent Office 2,909,588
Patented Oct. 20, 1959

2,909,588

STORAGE BATTERY SEPARATOR

Samuel Wyman Rolph, Philadelphia, Pa., assignor to The Electric Storage Battery Company, a corporation of New Jersey Application January 5, 1953, Serial No. 329,705

5 Claims. (Cl. 136—145)

The invention relates to separators for adjacent positive and negative plates of secondary or storage batteries and, more particularly, to that type of separator that is adapted for use in lead-acid batteries designed to have a long service life.

In the design and production of a storage battery, a feature of prime importance is the type of separator to be used, such separator being required to be of a type that must fulfill several different functions. On the one hand, the separator must have sufficient mechanical strength to prevent erosion or wear by vibration or motion of parts relative to one another with resulting short circuits. It is important, on the other hand, that the separator have sufficiently high porosity to permit ionic flow between the plates with a minimum of resistance. Additionally, and especially in batteries adapted for "cycling" service, the active material must be so supported that it will not become dislodged from the grid and yet it is vitally necessary that an adequate supply of acid have access to the active material, particularly of the positive plates, at all times.

In an attempt to solve these problems, there have been many different types of separators devised in the past. Furthermore, so-called "double separation" has been used in many batteries. This has included various combinations of separators, such as wood, microporous rubber, or microporous synthetic resins, and retainers such as slotted rubber, or glass fibre mats. Although satisfactory for many purposes, these combinations have resulted in increased costs necessitated by additional handling expenses. Furthermore, double separation generally gives rise to undesirable high internal resistance within the cell and the material occupies space that could to better advantage be filled with additional electrolyte.

It is an object of the invention to provide a separator for storage battery plates that will fulfill the requirements hereinbefore set forth and not be subject to the disadvantages of the various types of separation heretofore used.

Other objects and advantages of the invention will be apparent from the description and claims that follow:

Reference is now made to the drawings wherein like numerals are used to indicate like parts.

Figure 1 is a front elevation of a ribbed type of separator made in accordance with the invention.

Figure 2 is a cross-sectional view taken along the line 2—2 of Figure 1.

Figure 3 is a cross-sectional view of a modification of the separator shown in Figures 1 and 2.

Figure 4 is a cross-sectional view showing the separator of Figure 3 inserted between adjacent storage battery plates.

Figure 5 is a cross-sectional view of a separator, according to the present invention, adapted for "wrap around" application to a plate.

Figure 6 is a cross-sectional view showing the separator of Figure 5 as positioned around a positive plate.

Figure 7 is a cross-sectional view of the separator of Figure 1 modified to provide edge protection to the plates.

Figure 8 is a cross-sectional view showing separators according to Figure 7 inserted between adjacent positive and negative plates.

Figure 9 is a cross-sectional view of another form of the invention.

In the drawings, 10 indicates generally a separator produced in accordance with the invention. Separator 10 comprises basically a first wall 11 and a second wall 12 spaced apart and supported by a plurality of internal supports as indicated at 13. Supports 13 are so formed as to extend continuously from the bottom to the top of the separator and are in parallel relationship with each other thereby forming a plurality of separate compartments 14 which are especially adapted to permit circulation of electrolyte without washing the surfaces of the active material. Furthermore, compartments 14 provide at least as great a barrier against harmful "treeing" of active material as would be provided by a conventional type separator of equivalent thickness since there are no continuous pores throughout the width of the separator to support the growth of "trees" therethrough. The active material, once having penetrated either wall of the separator will drop through compartments 14 to the sediment space conventionally provided at the bottom of each cell thereby obviating any problems of short circuits caused by "treeing."

It will be understood that the separators embodying the invention are so designed that they can be formed as an integral whole and by one operation, such as extrusion. Furthermore, they are preferably formed of a microporous material, of which that disclosed in United States Patent No. 2,542,527—Honey and Hardy—can be taken as an example. It should be noted, however, that the present invention relates to the structural features of the separators disclosed herein and is not limited by the use of any particular process of producing them nor by any particular material used therein.

In a flat plate type battery, in order to prevent the possibility that the positive plate will be acid starved due to the separator laying flat against the active material, and clinging thereto when wet, it is preferable to use a ribbed construction. Such a construction as shown in the drawings comprises a plurality of vertical ribs 15 and 15a formed on the second wall 12, such ribs being adapted to abut the active material of the positive plate at all times to ensure that sufficient acid will always have access thereto. However, if desired the ribs 15 may be omitted particularly when the separator of the invention is to be used in a battery containing the well known tubular type of positive plate. Since in this type of construction, the flat separator has only a tangential contact with the individual tubes of the positive plate, or with the ribs formed on said tubes, there is sufficient space for electrolyte contiguous to said plate.

A modified design of separator containing the basic features of that shown in Figures 1 and 2 is disclosed in Figure 3. By the construction shown therein production of separators can be greatly increased, and production costs and subsequent handling costs both can be markedly decreased. In this modification, advantage is taken of the fact that the separators of my invention can readily be extruded or otherwise formed in twins 16 and 17 that are connected by a web or flashing 18, which flashing or web may, if desired, form a part of second wall 12.

As shown in Figure 4, the storage battery plates can be assembled with twin 16 inserted between the negative plate 19 and positive plate 20 and twin 17 separating positive plate 20 from negative plate 21. In this form of invention, ribs 15 will abut both sides of positive plate 20 to permit access of the electrolyte to the active material, and web 18 will provide edge protection to one end of said positive plate.

Figures 5 and 6 disclose a separator containing the basic features of the invention and which is, in addition, so constructed as to wrap around the positive plate, Figure 5 showing the separator as such and Figure 6 showing the separator enfolding said plate. This construction comprises the production of the compartmented separator in several different portions such as 22, 23, and 24, the portions being connected respectively by webs 25 and 26, which webs may form continuations of wall 12 as has been shown in regards to web 18 and wall 12 in Figure 3. The webs are adapted to abut the ends of positive plate 20 (Figure 6) and completely enclose them. Portion 22 is so constructed that the end compartment thereof is thinner than the remainder of said portion. Portion 24 is provided with extension 27 of wall 11, such extension being adapted to overlay the thin section of portion 22 when the separator is wrapped around the plate, whereby plate 20 is completely enveloped with the flat side of the separator in one continuous horizontal plane (Figure 6). The length of portions 22, 23 and 24 can, as shown, be so gauged that the overlapping of extension 27 and portion 22 will occur at the center of the plates at which point the pressure of the element pack will be greatest and ensure the proper tightness of the overlap. It will, of course, be understood that, should it be desirable to do so, the overlapped portions can be sealed together by the application of heat or suitable sealing agent.

Figures 7 and 8 indicate yet another modified form of the basic invention in which the ribbed separator of Figures 1 and 2 is provided additionally with pairs of end projections 28 and 29, and 30 and 31, extending outwardly from, and normal to, the faces of walls 11 and 12 respectively. This construction can either be satisfactorily produced by extrusion as an entity or the various component parts can be extruded separately and then heat or solvent sealed to produce a unitary construction. These projections are so arranged as to embrace the ends of adjacent plates as shown in Figure 8. Projections 30 and 31 extend outwardly a distance beyond the tips of ribs 15 equivalent to one half the thickness of positive plate 20 which is embraced by them and projections 28 and 29 extend outwardly from wall 11 a distance equal to one half the thickness of negative plates 19 and 21. By such an arrangement complete end protection for all plates is achieved.

The structure shown in Figure 9 is a complete unit produced in accordance with the invention and adapted to receive the plates for a storage battery cell. The unit comprises sides 32, 33, 34 and 35 containing plate receiving compartments such as 36 and 37 defined by a plurality of partitions 38. Partitions 38 between said plate receiving compartments are designed similarly to the separator shown in Figures 1 and 2, having walls 11 and 12, internal supports 13, compartments 14, and external ribs 15. Since compartments 37 are destined to receive the positive plates 20, ribs 15 of the adjoining partitions are always on the side of the partitions facing those compartments. When plates have been inserted into the various compartments, the entire unit can then be inserted into a container or jar.

According to the invention, therefore, there has been achieved a storage battery separator that provides both adequate mechanical strength and protection against "trees" of active material, and yet does not take up needed acid space nor result in inordinately high internal resistance within the cell.

It will be understood that the particular description and the various drawings hereinbefore set forth are examplary only and are not by way of limitation. Other similar constructions falling within the scope of the appended claims will suggest themselves to those skilled in the art.

What is claimed is:

1. In a storage battery containing positive and negative plates, a microporous separator including at least two portions thereof, each of said portions having a first wall, a second wall, a plurality of continuous supports at right angles to said walls spacing and supporting said walls in continuous parallel planes, one of said walls being externally provided with a plurality of ribs, and flexible web means connecting said portions of said separator.

2. The separator of claim 1 in which the ribs extend continuously and vertically for the length of the separator.

3. The separator of claim 1 in which the portions of said separator are inserted between adjacent positive and negative plates, the web means is adjacent to the edge portions of a positive plate, and the ribs abut the surfaces of said positive plate.

4. The separator of claim 1 in which at one end thereof said first wall is closer to said second wall than in the body of the separator and the other end of said first wall is provided with an extension to overlay said first end thereof when wrapped around a plate.

5. In a storage battery, means for separating adjacent positive and negative plates comprising a first wall, a second wall, said walls being substantially flat, and a plurality of vertical extending continuous supports at right angles to said walls spacing and supporting said walls in continuous parallel planes, said walls and said supports being integrally formed of microporous, acid resistant material, at least one of said walls being externally provided with a plurality of vertical ribs, said ribs being integrally formed with the remainder of said separating means.

References Cited in the file of this patent

UNITED STATES PATENTS

| 585,472 | Hatch | June 29, 1897 |
| 662,277 | Leitner | Nov. 20, 1900 |
| 825,837 | Horton | July 10, 1906 |
| 2,004,304 | Wells | June 11, 1935 |
| 2,607,810 | Walker | Aug. 19, 1952 |

FOREIGN PATENTS

| 369,172 | France | Nov. 6, 1906 |